United States Patent [19]

Yamaki et al.

[11] 4,444,051
[45] Apr. 24, 1984

[54] ELECTRONIC LIQUID LEVEL GAUGE

[75] Inventors: Kiyoshi Yamaki; Hidetaka Suzuki, both of Yokosuka, Japan

[73] Assignee: Nissan Motor Company, Limited, Yokohama, Japan

[21] Appl. No.: 357,585

[22] Filed: Mar. 12, 1982

[30] Foreign Application Priority Data

Mar. 18, 1981 [JP] Japan .................................. 56-39186
Jun. 22, 1981 [JP] Japan .................................. 56-96350

[51] Int. Cl.³ ............................................. G01F 23/26
[52] U.S. Cl. .................................. 73/304 C; 73/304 R
[58] Field of Search ......................... 73/304 C, 304 R; 328/129.1, 130.1

[56] References Cited

U.S. PATENT DOCUMENTS 4,083,248 4/1978 Maier .
4,199,984 4/1980 Huddart et al. .
4,214,479 7/1980 Maier .
4,226,118 10/1980 Aldrich .............................. 73/290 V

FOREIGN PATENT DOCUMENTS 2852212 6/1980 Fed. Rep. of Germany .
2055477 3/1981 United Kingdom .

Primary Examiner—Gerald Goldberg
Assistant Examiner—Hezron Williams
Attorney, Agent, or Firm—Schwartz, Jeffery, Schwaab, Mack, Blumenthal & Koch

[57] ABSTRACT

An electronic liquid level gauge for measuring the level of a liquid contained in a vessel by employing an electrode pair immersed in the liquid. The electrode pair is associated with an oscillator which generates pulses of a repetition period directly proportional to the electrostatic capacity of the electrode pair. A counter is provided which is reset by an oscillator pulse and starts counting reference pulses of a predetermined repetition rate with a predetermined time delay relative to the occurrence of the oscillator pulse.

17 Claims, 6 Drawing Figures

ELECTRONIC LIQUID LEVEL GAUGE

BACKGROUND OF THE INVENTION

This invention relates to an electronic liquid level gauge for measuring the level of a liquid contained in a vessel and, more particularly, to such an electronic liquid level gauge employing an electrode pair having two electrode plates facing in spaced-parallel relation to each other and immersed in the liquid, the electrode pair having an electrostatic capacity determined by the liquid level.

It has theretofore been proposed to measure the level of a liquid contained in a vessel by employing an electrode pair having two electrode plates faced in spaced-parallel relation to each other and immersed in the liquid, the electrode pair having an electrostatic capacity determined by the liquid level. Assuming now that the specific inductive capacity of the liquid is $\epsilon_G$, the length of the electrode pair is L, and the electrode pair has a portion immersed in the liquid, the length of which portion is l, the electrostatic capacity C of the electrode pair is defined by $$C = K\{(L-l) + \epsilon_G l\} = K\{(\epsilon_G - 1)l + L\} \quad (1)$$

wherein K is a constant determined by the shape of the electrode pair and the distance between the electrode plates. Solving for l we have $$l = (C/K - L)/(\epsilon_G - 1) = A(C - B) \quad (2)$$

wherein $A = 1/\{K(\epsilon_G - 1)\}$ and $B = LK$.

It is the conventional practice to associate the electrode pair with an oscillator which generates oscillator pulses at a repetition period T directly proportional to the electrostatic capacity C of the electrode pair. The oscillator pulse repetition period T, which is represented by DC, is detected by a detector. The detector output is coupled to a subtractor which subtracts a constant B' from the oscillator pulse repetition period D·C. The resulting difference (DC−B') is multiplied by a constant A' in a multiplier. The resulting product A'×(DC−B') can be made to correspond to the liquid level l by suitably selecting the constants A', B' and D to satisfy equation (2). However, such conventional practice utilizes a binary subtractor and a binary multiplier and requires complex hardware and expensive microcomputer for accurate liquid level measurements.

In some instances where it is required to measure the level of liquid such as, for example, petrol having its specific inductive capacity changed as a function of temperature or by mixing therein petroleum economizer or other additives, another electrode pair has been employed in addition to the former electrode pair. The latter electrode pair has two electrode plates facing in spaced-parallel relation to each other and immersed in the liquid, the electrode pair having an electrostatic capacity determined by the specific inductive capacity of the liquid. Assuming that the former electrode pair has a length L, an area $S_1$, and a portion immersed in the liquid, the length of which portion is l, that the distance between the electrode plates of the former electrode pair is $d_1$, and that the specifc inductive capacity of the liquid is $\epsilon_r$ and the dielectric constant of air is $\epsilon_o$, the electrostatic capacity $C_1$ of the former electrode pair is given by $$C_1 = \epsilon_r \cdot \epsilon_o \cdot \frac{S_1 \times \frac{l}{L}}{d_1} + \epsilon_o \cdot \frac{S_1 \times \frac{L-l}{L}}{d_1} \quad (3)$$

$$= \frac{S_1 \cdot \epsilon_o}{L \cdot d_1}(l \cdot \epsilon_r + L - l)$$

Solving for l we have $$l = \frac{C_1 - A'' \cdot L}{A'' \cdot (\epsilon_r - 1)} = \frac{C_1 - C_o}{A'' \cdot (\epsilon_r - 1)} \quad (4)$$

wherein $A''$ is a constant represented by $S_1 \cdot \epsilon_o / L \cdot d_1$ and $C_o = A'' \cdot L = S_1 \cdot \epsilon_o / d_1$ is the electrostatic capacity of the former electrode pair when the vessel is emptied.

Assuming that the latter electrode pair has an area $S_2$ and the distance between the electrode plates is $d_2$, the electrostatic capacity $C_2$ of the latter electrode pair is given by $$C_2 = \epsilon_o \cdot \epsilon_r \cdot S_2 / d_2 \quad (5)$$

Solving for $\epsilon_r$ we have $$\epsilon_r = \frac{C_2 \cdot d_2}{\epsilon_o \cdot S_2} \quad (6)$$

and equation (4) becomes $$l = L \cdot \frac{C_1 - C_o}{K \cdot C_2 - C_o} \quad (7)$$

wherein K is a constant represented by $(d_2 \cdot S_1)/(d_1 \cdot S_2)$.

It is the conventional practice to associate the former electrode pair with an oscillator which generates oscillator pulses at a repetition period $T_1$ directly proportional to the electrostatic capacity $C_1$ of the former electrode pair. The oscillator pulse repetition period $T_1$, which is represented by $B_1 \cdot C_1$, is converted into a binary number by a repetition period detector. The detector output is coupled to a subtractor which subtracts a constant $B_1 \cdot C_1$ from the repetition rate binary value and provides a difference $B_1 \cdot (C_1 - C_o)$.

The latter electrode pair is associated with an oscillator which generates oscillator pulses at a repetition period $T_2$ directly proportional to the electrostatic capacity $C_2$ of the latter electrode pair. The oscillator pulse repetition period $T_2$, which is represented by $B_2 \cdot C_2$, is converted into a binary number by a repetition period detector. The detector output is coupled to a multiplier which multiplies a constant K by the repetition period binary number $B_2 \cdot C_2$. The multiplier output is coupled to a subtractor which subtracts a constant $B_2 \cdot C_o$ from the resulting product $K \cdot B_2 \cdot C_2$ and provides a difference $B_2 \cdot (K \cdot C_2 - C_o)$. The resulting difference $B_1 \cdot (K \cdot C_2 - C_o)$ is divided by the difference $B_2 \cdot (K \cdot C_2 - C_o)$ in a divider which provides a value $B_1 \cdot (C_1 - C_o) / B_2 \cdot (K \cdot C_2 - C_o)$. The divider output is coupled to a multiplier which multiplies the value $B_1(C_1 - C_o)/B_2 \cdot (K \cdot C_2 - C_o)$ by a constant $L \cdot B_2 / B_1$ and provides a product $L \cdot (C_1 - C_o)/(K \cdot C_2 - C_o)$, which agrees with the liquid level l represented by equation (7). However, such conventional practice utilizes two binary dividers, two binary subtractors, and two binary multipliers and requires complex hardware and expensive microcomputer for accurate liquid level measurements.

This invention provides an improved electronic liquid level gauge which employs a simple and inexpensive electronic circuit and gives correct liquid level measurements within close tolerances.

SUMMARY OF THE INVENTION

There is provided, in accordance with the present invention, an apparatus for measuring the level of a liquid contained in a vessel. The apparatus comprises an electrode pair having two electrode plates facing in spaced-parallel relation to each other and immersed in the liquid. The electrode pair has an electrostatic capacity determined by the liquid level. The electrode pair is associated with an oscillator which generates oscillator pulses at a repetition period directly proportional to the electrostatic capacity of the electrode pair. The apparatus also comprises a reference pulse generator for generating a series at reference pulses of a predetermined repetition period. A signal generator is provided which generates a reset signal in response to an oscillator pulse from the oscillator and generates a start signal with a predetermined time delay relative to the occurrence of the oscillator pulse. A counter is adapted to start counting reference pulses from the reference pulse generator in response to a start signal from the signal generator. The counter is reset to zero in response to a reset signal from the signal generator so that the value of the count in the counter agrees with the liquid level upon the occurrence of the reset signal.

In an alternative embodiment of the present invention, the apparatus measures the level of a liquid contained in a vessel with the change in the specific inductive capacity of the liquid being taken into account. The apparatus comprises a first electrode pair having two electrode plates faced in spaced-parallel relation to each other and immersed in the liquid, the first electrode pair having an electrostatic capacity determined by the liquid level; a first oscillator associated with the first electrode pair for generating first oscillator pulses at a repetition period directly proportional to the electrostatic capacity of the first electrode pair; a first pulse generator, responsive to a first oscillator pulse from the first oscillator, for generating first pulse-generator pulses of a predetermined pulse width; a second electrode pair having two electrode plates facing in spaced-parallel relation to each other and immersed in the liquid, the second electrode pair having an electrostatic capacity determined by the specific inductive capacity of the liquid; a second oscillator associated with the second electrode pair for generating second oscillator pulses at a repetition period directly proportional to the electrostatic capacity of the second electrode pair; and a second pulse generator, responsive to a second oscillator pulse from the second oscillator, for generating second pulse-generator pulses of a predetermined pulse width. The apparatus also comprises a first gate circuit for passing second oscillator pulses from the second oscillator in response to a first pulse-generator pulse trailing edge, the first gate circuit blocking the second oscillator pulses in response to a first pulse-generator pulse leading edge; a second gate circuit for passing first oscillator pulses from the first oscillator in response to a second pulse-generator pulse trailing edge, the second gate circuit blocking the first oscillator pulses in response to a second pulse-generator pulse leading edge; and a counter adapted to be reset and at the same time start counting pulses from the first gate circuit in response to a pulse from the second gate circuit so that the value of the count in the counter agrees with the liquid level upon the occurrence of the pulse from the second gate circuit.

BRIEF DESCRIPTION OF THE DRAWINGS

The details as well as other features and advantages of this invention are set forth below and are shown in the accompanying drawings, in which.

DESCRIPTION OF THE PREFERRED EMBODIMENTS

Figure 1:
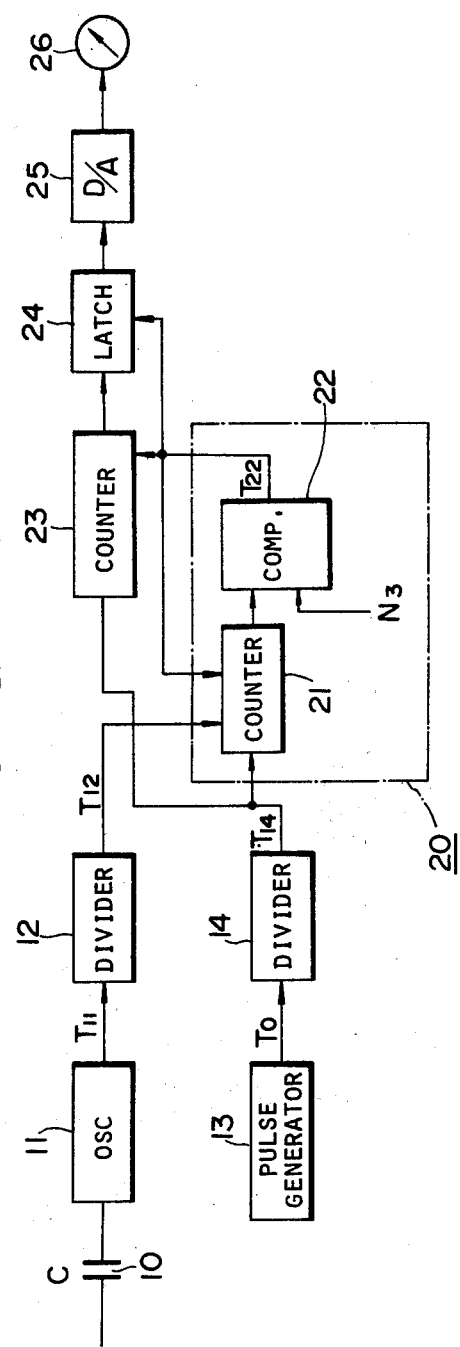
FIG. 1 is a schematic block diagram showing one embodiment of an electronic liquid level gauge made in accordance with the present invention.
Figure 2:
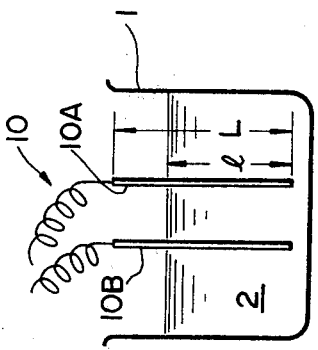
FIG. 2 is a schematic view of an electrode pair used in the electronic liquid level gauge of FIG. 1.

Referring first to FIGS. 1 and 2 of the drawings, there is illustrated one embodiment of an electronic liquid level gauge made in accordance with the present invention. The liquid level gauge employs an electrode pair 10 which, as shown in FIG. 2, has two electrode plates 10A and 10B facing in spaced-parallel relation to each other and immersed in a liquid 2 contained in a vessel 1. The electrode plates constitute a capacitor having an electrostatic capacity determined by the level of the liquid. The electrode pair 10 is associated with an oscillator 11 which generates oscillator pulses at a repetition rate $T_{11}$ directly proportional to the electrostatic capacity of the electrode pair 10. The oscillator pulse output is coupled to a divider 12 which has a predetermined frequency divisor $N_1$ so that the pulse signal outputted therefrom has a repetition period $T_{12}$ represented by $T_{11} \times N_1$.

The liquid level gauge also employs a reference pulse generator 13 which generates a series of reference pulses at a predetermined repetition period $T_o$. The reference pulses are coupled to a divider 14 which has a predetermined dividing ratio $N_2$ so that the pulse signal outputted therefrom has a repetition period $T_{14}$ represented by $T_o \times N_2$. The output of the divider 12 is coupled to a monostable multivibrator 20 which is shown as including a counter 21 and a comparator 22. When receiving a pulse from the divider 12, the counter 21 is reset to zero and at the same time starts counting pulses from the divider 14. The output of the counter 21 is coupled to the comparator 22 which compares the value of the count in the counter 21 with a reference value $N_3$ and provides a high output when the former is equal to the latter. The output of the comparator 22 is held low before the value of the count in the counter 21 reaches the predetermined value $N_3$. The counter 21 stops counting up in response to the high output of the comparator 22. The output of the comparator 22 is held low for a fixed time $T_{22}$ during which the counter 21 counts a predetermined number $N_3$ of pulses having a repetition period $T_{14}$ ($=T_o \times N_2$). Consequently, the time $T_{22}$ is represented by $N_3 \times N_2 \times T_o$.

The output of the monostable multivibrator 20 or the comparator 22 is coupled to a counter 23 which starts counting pulses from the divider 14 when the output of the comparator 22 goes high. The counter 23 is reset to zero when the output of the comparator 22 goes low which is caused by the next pulse applied from the divider 12 to the counter 21 so as to reset it to zero. The output of the comparator 22 is also coupled to a latch circuit 24. The latch circuit 24 latches the value of the count in the counter 23 just before the counter 23 is reset when the output of the comparator 22 goes low. The latched count value $T_{23}$ is represented by $T_{12}$-$T_{22}$. The output of the latch circuit 24 is coupled to a digital-to-analog converter 25 wherein the latched count value is converted into analog form. The output of the D to A converter 25 is coupled to an analog meter 26 for indication of the converted analog value which represents the liquid level in a linear relationship to the electrostatic capacity C of the electrode pair 10, as will be described in greater detail.

Figure 3:
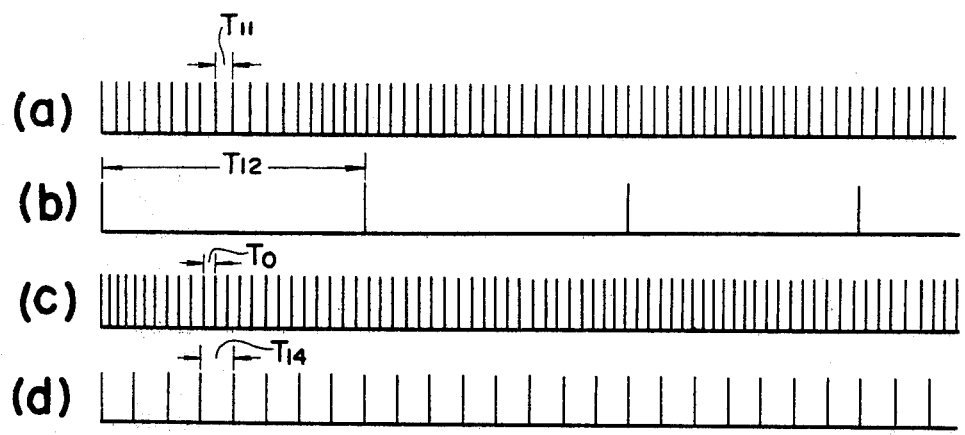
FIG. 3 illustrates waveforms obtained at various points in the schematic block diagram of FIG. 1.
Figure 3:
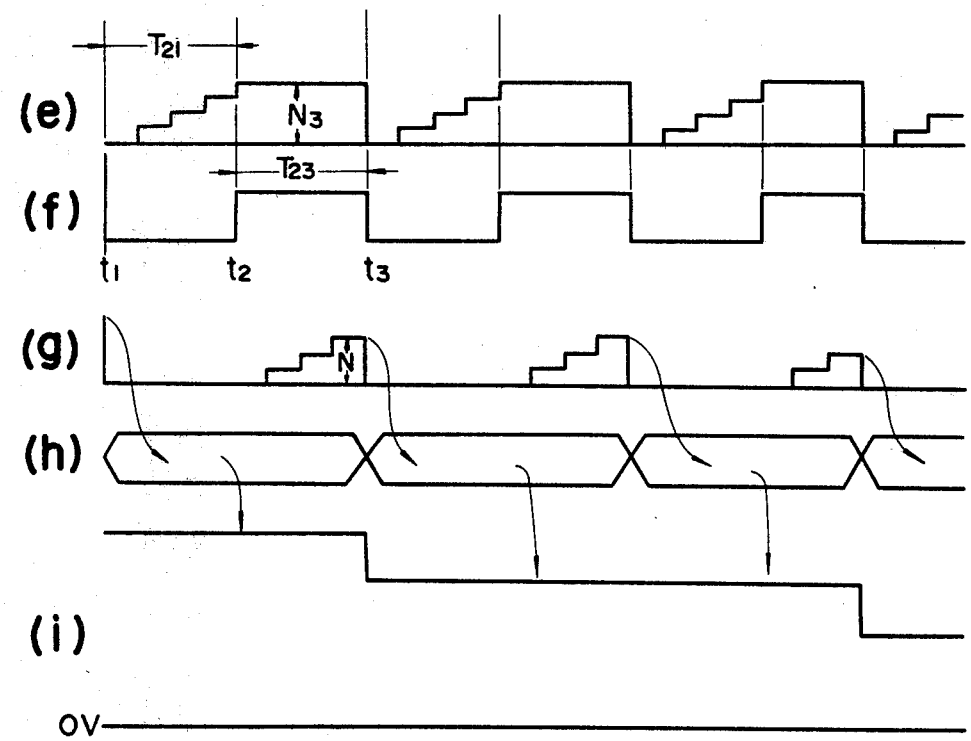

With particular reference now to FIG. 3, there are shown voltage-versus-time waveforms obtained at various points in the circuit of FIG. 1. FIG. 3a illustrates the pulse output produced by the oscillator 11. The oscillator pulse output has a repetition period $T_{11}$ directly proportional to the electrostatic capacity C of the electrode pair 10. FIG. 10b illustrates the pulse output produced by the divider 12. The divider pulse output has a repetition period $T_{12}$, represented by $T_{11} \times N_1$, which is obtained as a result of dividing the repetition frequency $1/T_{11}$ of the oscillator pulse output by a predetermined frequency divisor $N_1$. FIG. 3c illustrates the pulse output produced by the reference pulse generator 13, which has a predetermined repetition period $T_o$. FIG. 3d illustrates the pulse output produced by the divider 14. The divider pulse output has a repetition period $T_{14}$, represented by $T_o \times N_2$, which is obtained as a result of dividing the repetition frequency $1/T_o$ of the generator output pulses by a predetermined frequency divisor $N_2$.

At time $t_1$ when a pulse applied from the divider 12 to the counter 21, the counter 21 starts counting the pulses from the divider 14, as shown in FIG. 3e. At time $t_2$ when the value of the count in the counter 21 reaches a predetermined value $N_3$, the output of the comparator 22 changes from its low level to its high level, as shown in FIG. 3f, and at the same time the counter 21 stops counting the pulses, as shown in FIG. 3e. The time $T_{21}$ during which the counter 21 counts a predetermined number $N_3$ of pulses having a repetition period $T_{14}$ (=$T_o \times N_2$) from the divider 14 is a fixed value represented by $N_3 \times N_2 \times T_o$.

The counter 23 starts counting pulses from the divider 14, as shown in FIG. 3g, at time $t_2$ when the output of the comparator 22 goes high. The counter 23 stops counting the pulses at time $t_3$ when the output of the comparator 22 goes low and the counter 21 is reset to zero. At time $t_3$, the counter 21 starts counting pulses from the divider 14 again, as shown in FIG. 3e.

As can be seen in FIG. 3, the time $T_{23}$ during which the counter 23 counts the pulses from the divider 14 is represented by $$T_{23} = T_{12} - T_{21} = N_1 \times T_{11} - N_3 \times N_2 \times T_o \quad (8)$$

The number N of the pulses counted by the counter 23 and latched in the latch circuit 24 is given by $$N = T_{21} \times \frac{1}{T_{14}} = \frac{N_1 \times T_{11} - N_3 \times N_2 \times T_o}{T_o \times N_2} \quad (9)$$

Since the value $T_{11}$ is directly proportional to the electrostatic capacity C of the electrode pair 10 and can be represented by $T_{11} = C \times D$, wherein D is a constant, equation (4) may be rewritten as $$N = \frac{N_1 \times D}{N_2 \times T_o}\left(C - \frac{N_3 \times N_2 \times T_o}{N_1 \times D}\right) \quad (10)$$

It can be seen from a comparison of equations (2) and (10) that the value N latched in the latch circuit 24 can be made to correspond to the liquid level 1 by suitably selecting the constant values $N_1$, $N_2$, $N_3$, D and $T_o$ to satisfy the following equations (11) and (12):

$$\frac{N_1 \times D}{N_2 \times T_o} = \frac{1}{K(\epsilon_G - 1)} \quad (11)$$

$$\frac{N_3 \times N_2 \times T_o}{N_1 \times D} = L \cdot K \quad (12)$$

Upon the occurrence of a pulse from the divider 12, the value N of the count in the counter 23 is latched in the latch circuit 24, as shown in FIG. 3h. The latched value is applied to the D to A converter 25 which converts it into analog form, as shown in FIG. 3i. The converted analog value is indicated on the analog meter 26.

While the measured liquid level is indicated on an analog meter in this embodiment, it will be appreciated that a digital indicator may be used to provide thereon a digital indication of the measured liquid level by directly reading the count value in the counter 23. The value in the counter 23 or the latch circuit 24 may be utilized for other calculations made based upon the measured liquid level, such as for example, calculations of the possible distance of travel of an automotive vehicle from values of fuel consumption rate and residual fuel quantity.

The dividers 12 and 14, used for adjustment of the pulse sampling timing, may be eliminated in some instances dependent upon the kind of liquid used and the required accuracy of liquid level measurement. In automotive vehicle fuel level measuring applications, the oscillator 11 should be designed to generate a pulse signal at a repetition frequency as high as several hundred kilohertz in order to avoid the influence of the gasoline's dielectric constant upon the frequency characteristics. However, the fuel level indication changes improperly on the order of a microsecond without the divider 12. It is desirable in such applications to indicate the measured fuel level on a minute order to provide stabilized fuel level indication with the fuel level shaking produced by vehicle vibration being absorbed in the count. To achieve such stabilized fuel level indication, the divider 12 may be designed to have a frequency divisor on the order of $10^8$. The divider 14 may be eliminated in employing a reference pulse generator adapted to generate a series of pulses at a low repetition frequency. It is desirable, however, to use the divider 14 because of cost and space considerations. The reference pulse generator 13 normally includes a capacitor on which its time constant is dependent. A large and expensive capacitor is required to obtain a series of pulses having a low repetition frequency, resulting in a space-consuming and expensive structure.

It is preferable in automotive vehicle fuel level measuring applications to change the divisor of the divider 12 to a small value so that the divider 12 generates pulses at longer time intervals during vehicle travelling and to a large value so that the divider 12 generates pulses at shorter time intervals during vehicle starting and refueling. This may be attained by replacing the divider 12 with a presettable divider, the divisor of which is changed in accordance with a signal such as, for example, a vehicle speed indicative signal from a vehicle speed sensor.

While the monostable multivibrator 20 has been shown and described as comprised of a counter 21 and a comparator 22, there is no intention to be limited to such monostable multivibrator. Alternatively, a currently used monostable multivibrator having a CR time constant circuit may be used as long as its operation is maintained within close tolerances. A further alternative device is a pulse generator which generates a first signal in response to a pulse from the divider 12 and a second signal with a predetermined time delay relative to the occurrence of the pulse from the divider 12.

Figure 4:
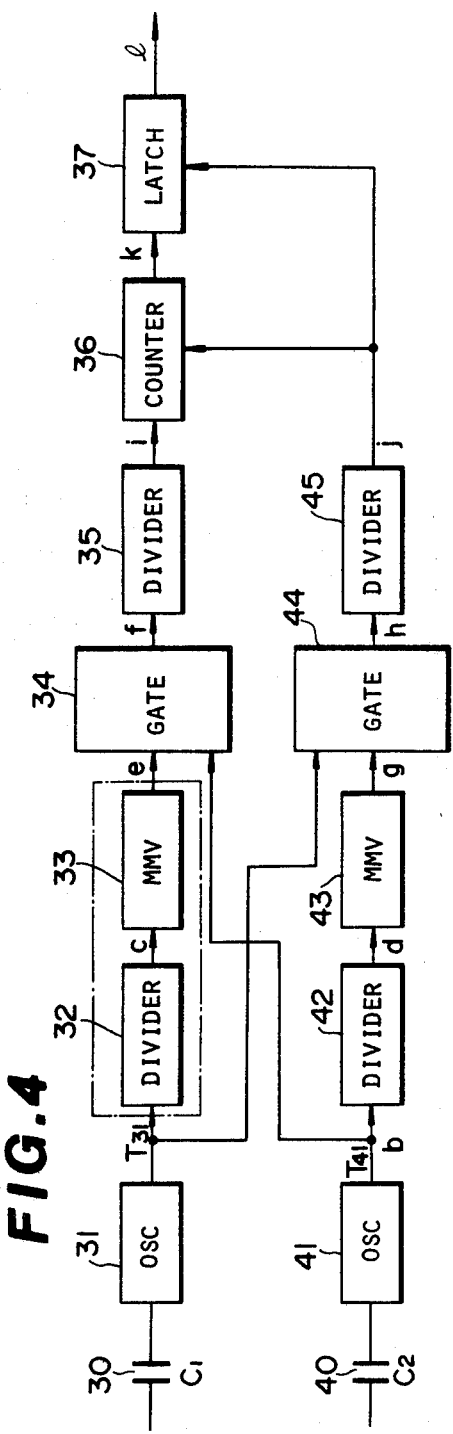
FIG. 4 is a schematic block diagram showing an alternative embodiment of the electronic liquid level gauge of the present invention.
Figure 5:
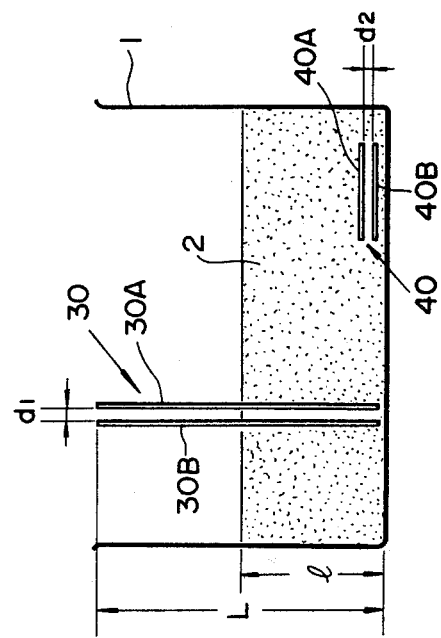
FIG. 5 is a schematic view of two electrode pairs used in the electronic liquid level gauge of FIG. 4.

Referring to FIGS. 4 and 5, there is illustrated another embodiment of the electronic liquid level gauge of the present invention. The liquid level gauge employs first and second electrode pairs 30 and 40. The first electrode pair 30 has two electrode plates 30A and 30B facing in spaced-parallel relation to each other and immersed in a liquid 2 contained in a vessel 1. The electrode plates 30A and 30B constitute a capacitor having an electrostatic capacity determined by the level of the liquid. The second electrode pair 40 has two electrode plates 40A and 40B facing in spaced-parallel relation to each other and immersed in the liquid 2. The electrode plates 40A and 40B constitute a capacitor having an electrostatic capacity determined by the specific inductive capacity of the liquid. The second electrode pair 40 is placed near the bottom of the vessel 1.

The first electrode pair 30 is associated with an oscillator 31 which generates oscillator pulses at a repetition period $T_{31}$ directly proportional to the electrostatic capacity $C_1$ of the first electrode pair 30. The oscillator pulse output is coupled to a divider 32 which has a predetermined frequency-divisor $N_{32}$ so that the pulse signal outputted therefrom has a repetition period $T_{32}$ represented by $T_{32} = T_{31} \times N_{32}$. The divider pulse output is used to trigger a monostable multivibrator 33 into its unstable state. The monostable multivibrator 33 generates a pulse signal having a pulse width $T_{33}$ and a repetition period of $T_{31} \times N_{32}$.

The second electrode pair 40 is associated with an oscillator 41 which generates oscillator pulses at a repetition period $T_{41}$ directly proportional to the electrostatic capacity $C_2$ of the second electrode pair 40. The oscillator pulse output is coupled to a divider 42 which has a predetermined frequency divisor $N_{42}$ so that the pulse signal outputted therefrom has a repetition period $T_{42}$ represented by $T_{42} = T_{41} \times N_{42}$.

The output of the monostable multivibrator 33 is coupled to a gate circuit 34 which passes pulses from the oscillator 41 only when the monostable multivibrator 33 is in its stable state. Thus, the time during which the gate circuit 34 passes the oscillator pulses is represented by $T_{41} \times N_{32} - T_{33}$. The output of the gate circuit 34 is coupled through a divider 35 to a counter 36. The divider 35 has a predetermined frequency divisor $N_{35}$. The output of the monostable multivibrator 43 is coupled to a gate circuit 44 which passes pulses from the oscillator 31 only when the monostable multivibrator 43 is in its stable state. Thus, the time during which the gate circuit 44 passes the oscillator pulses is represented by $T_{31} \times N_{42} - T_{43}$. The output of the gate circuit 44 is coupled to a divider 45 having a predetermined frequency divisor $N_{45}$. The output of the divider 45 is coupled to the counter 36 and also to a latch circuit 37. The counter 36 is reset to zero and at the same time starts counting pulses from the divider 35 in response to a pulse from the divider 45. The latch circuit 37 latches the value of the count in the counter 36 in response to a pulse from the divider 45.

Figure 6:
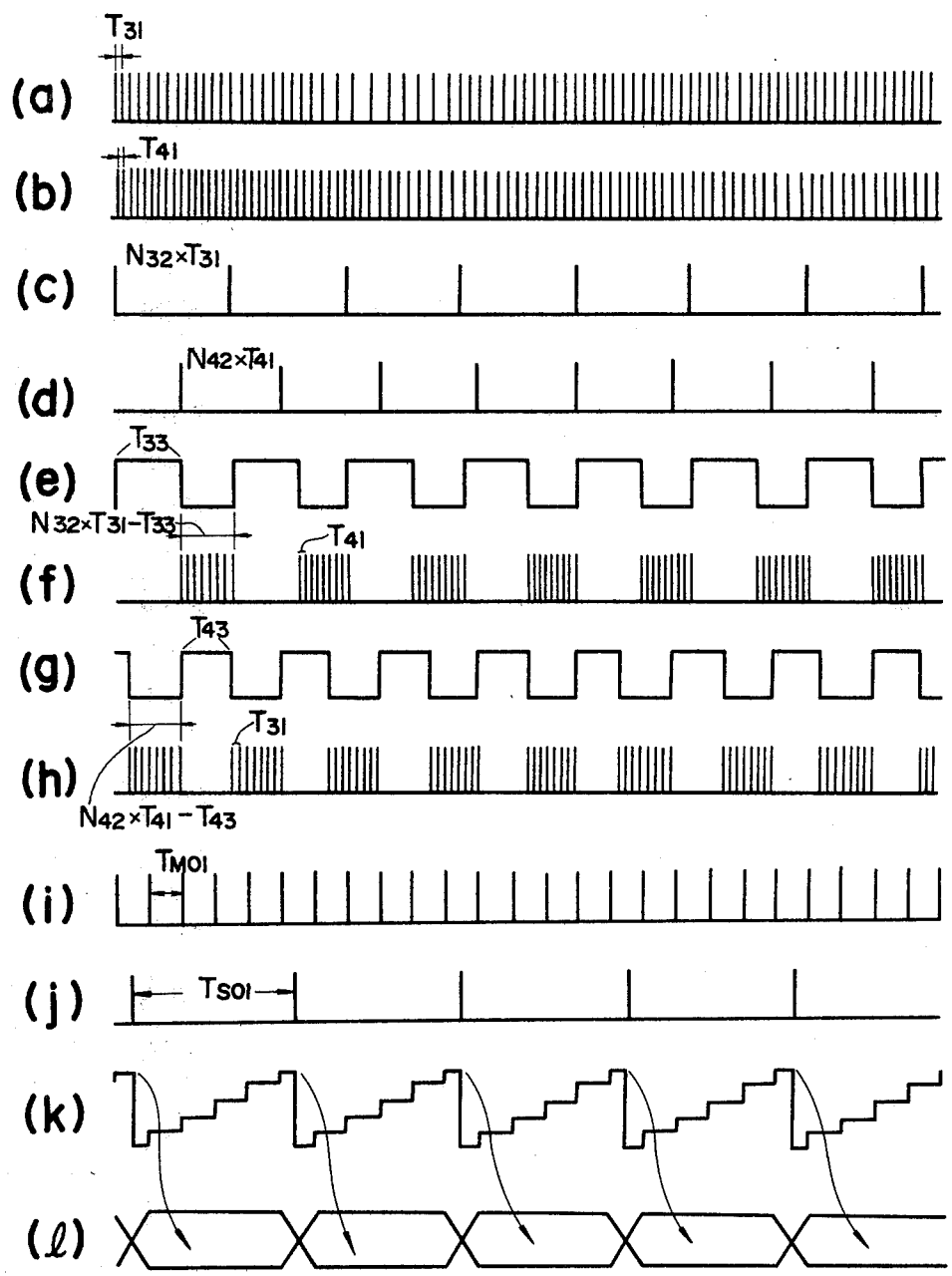
FIG. 6 illustrates waveforms obtained at various points in the schematic block diagram of FIG. 4.

With particular reference now to FIG. 6, there are shown voltage-versus-time waveforms obtained at various points in the circuit of FIG. 4. FIGS. 6a to 6h are drawn on the same time scale. FIG. 6i to 6l are drawn on the same time scale as each other but on an enlarged time scale as compared to that of FIGS. 6a to 6h.

FIG. 6a illustrates the pulse output produced by the oscillator 31. The oscillator pulse output has a repetition period $T_{31}$ directly proportional to the electrostatic capacity $C_1$ of the first electrode pair 30. The repetition period $T_{31}$ is represented by $B_1 \times C_1$, wherein $B_1$ is a constant. FIG. 6b illustrates the pulse output produced by the oscillator 41. The oscillator pulse output has a repetition period $T_{41}$ directly proportional to the electrostatic capacity $C_2$ of the second electrode pair 40. The repetition period $T_{41}$ is represented by $B_2 \times C_2$, wherein $B_2$ is a constant. FIG. 6c illustrates the pulse output produced by the divider 32. The divider pulse output has a repetition period $T_{31} \times N_{32}$ obtained as a result of dividing the repetition frequency $1/T_{31}$ of the oscillator pulse output by a predetermined frequency divisor $N_{32}$. FIG. 6d illustrates the pulse output produced by the divider 42. The divider pulse output has a repetition period $T_{41} \times N_{42}$ obtained as a result of dividing the repetition frequency $1/T_{41}$ of the oscillator pulse output by a predetermined frequency divisor $N_{42}$.

FIG. 6e illustrates the pulse output produced by the monostable multivibrator 33 which is triggered into its unstable state to provide a high output by a pulse from the divider 32. The output of the monostable multivibrator 33 remains high for a predetermined time $T_{33}$ and then goes low. Thus, the multivibrator pulse output has a pulse width of $T_{33}$ and a repetition period equal to that of the pulse signal from the divider 32. FIG. 6g illustrates the pulse output produced by the monostable multivibrator 43 which is triggered into its unstable state to provide a high output by a pulse from the divider 42. The output of the monostable multivibrator 43 remains high for a predetermined time $T_{43}$ and then goes low. Thus, the multivibrator pulse output has a pulse width of $T_{43}$ and a repetition period equal to that of the pulse signal from the divider 42.

FIG. 6f illustrates the pulse output produced by the gate circuit 34 which responds to a stable state of the monostable multivibrator 33 for passing pulses from the oscillator 41. The time during which the monostable multivibrator is in its stable state is represented by $N_{32} \cdot T_{31} - T_{33}$. Thus, the average repetition period $T_{MO}$ of the pulse signal from the gate circuit 34 may be given by $$T_{MO} = N_{32} \times T_{31} \div \frac{N_{32} \times T_{31} - T_{33}}{T_{41}} \quad (13)$$

$$= T_{41} \cdot \frac{N_{32} \cdot T_{31}}{N_{32} \cdot T_{31} - T_{31}}$$

FIG. 6h illustrates the pulse output produced by the gate circuit 44 which responds to a stable state of the monostable multivibrator 43 for passing pulses from the oscillator 31. The time during which the monostable multivibrator is in its stable state is represented by $N_{42} \times T_{41} - T_{43}$. Thus, the average repetition period $T_{SO}$ of the pulse signal from the gate circuit 44 may be given by $$T_{SO} = N_{42} \times T_{41} \div \frac{N_{42} \times T_{41} - T_{43}}{T_{31}} \quad (14)$$

$$= T_{31} \cdot \frac{N_{42} \cdot T_{41}}{N_{42} \cdot T_{41} - T_{43}}$$

FIG. 6i illustrates the pulse output produced by the divider 35 which divides the repetition frequency of the pulse signal from the gate circuit 34 by a predetermined frequency divisor $N_{35}$. The divider output pulse has an average repetition rate $T_{MO1}$ which is represented by $$T_{MO1} = N_{35} \times T_{MO} = N_{35} \cdot T_{41} \cdot \frac{N_{42} \cdot T_{41}}{N_{32} \cdot T_{31} - T_{43}} \quad (15)$$

FIG. 6j illustrates the pulse output produced by the divider 45 which divides the repetition frequency of the pulse signal from the gate circuit 44 by a predetermined frequency divisor $N_{45}$. The divider output pulse has an average repetition rate $T_{SO1}$ which is represented by $$T_{SO1} = N_{45} \times T_{SO} = N_{45} \cdot T_{31} \cdot \frac{N_{42} \cdot T_{41}}{N_{42} \cdot T_{41} - T_{43}} \quad (16)$$

FIG. 6k illustrates the value of the count in the counter 36 which is reset to zero and at the same time starts counting pulses from the divider 35 when receiving a pulse from the divider 45. The latch circuit 37 responds to a pulse from the divider 45 for latching the value of the count in the counter 36, as shown in FIG. 6l. The latched value N is represented by $$N = T_{MO1} \times T_{SO1} \quad (17)$$

$$= \frac{N_{42}}{N_{35}} \times \frac{N_{45}}{N_{32}} \times \frac{N_{32} \cdot T_{31} - T_{33}}{N_{42} \cdot T_{41} - T_{43}}$$

$$= \frac{N_{45}}{N_{35}} \times \frac{1}{B_1} \times \frac{C_1 - T_{33}/(B_1 \cdot N_{32})}{B_2 \cdot C_2 - T_{43}/N_{42}}$$

It can be seen from a comparison of equations (7) and (17) that the value N latched in the latch circuit 37 can be made to correspond to the liquid level l by suitably selecting the constants $N_{32}$, $N_{42}$, $N_{35}$, $N_{45}$, $B_1$, $B_2$, $T_{33}$, and $T_{44}$ to satisfy the following equations:

$$\frac{N_{45}}{N_{35}} \cdot \frac{1}{B_1} = L$$

$$\frac{T_{33}}{B_1 \cdot N_{32}} = \frac{T_{43}}{N_{42}} = C_o$$

-continued $$B_2 = K$$

The divider 35, used for adjustment of the pulse sampling timing, may be eliminated in some instances dependent upon the kind of liquid used and the required accuracy of liquid level measurement. In automotive vehicle fuel level measuring applications, however, it is desirable to use the divider so as to provide stabilized fuel level measurement with the fuel level shaking being absorbed which occurs during automotive vehicle running.

While the present invention has been described in conjunction with specific embodiments thereof, it is evident that many alternatives, modifications and variations will be apparent to those skilled in the art. Accordingly, it is intended to embrace all aternatives, modifications and variations that fall within the spirit and broad scope of the appended claims.

What is claimed is:

1. An apparatus for measuring the level of a liquid contained in a vessel, comprising:
    (a) an electrode having an electrostatic capacity determined by the liquid level;
    (b) an oscillator connected to said electrode for generating oscillator pulses at a repetition period directly proportional to the electrostatic capacity of said electrode;
    (c) a reference pulse generator for generating a series of reference pulses at a predetermined repetition period;
    (d) a counter, responsive to a start signal, for counting reference pulses from said reference pulse generator, said counter being reset to zero in response to a reset signal; and
    (e) a control circuit, responsive to an oscillator pulse from said oscillator for generating said reset signal to reset said counter, and for generating said start signal to start said counter, said start signal being generated with a predetermined time delay relative to the occurrence of the oscillator pulse from the oscillator, thereby permitting said counter to accumulate a count for a time interval between successive reset signals, said count being representative of the liquid level.

2. The apparatus of claim 1, wherein said electrode comprises two electrode plates facing in spaced-parallel relation to each other and immersed in the liquid.

3. The apparatus of claim 1, wherein said control circuit comprises a monostable device triggered by an oscillator pulse from said oscillator into an unstable state to provide a reset signal to said counter, said monostable device returning to a stable state to provide a start signal to said counter a predetermined time after the occurrence of the oscillator pulse from the oscillator.

4. The apparatus of claim 3, wherein said monostable device comprises:
    a second counter responsive to an oscillator pulse from said oscillator for being reset to zero and at the same time starting counting reference pulses from said reference pulse generator; and
    means for generating a signal to start said first mentioned counter and stop said second counter from counting reference pulses when said second counter accumulates a value equal to a predetermined value, said means generating a signal to reset said first mentioned counter when the count of said second counter is below said predetermined value.

5. The apparatus of claim 1, wherein said oscillator includes a divider for providing pulses of a repetition period represented by the product of the repetition period of the oscillation pulses and a predetermined frequency divisor to said signal generator.

6. The apparatus of claim 5, wherein said divider has a plurality of predetermined frequency divisors, said divider being operable to select one of said predetermined frequency divisors in accordance with vehicle speed so as to provide pulses of a repetition period represented by the product of the repetition of the oscillator pulses and said selected one of said predetermined frequency divisors.

7. The apparatus of claim 5, wherein said reference pulse generator includes circuit for producing higher frequency pulses and a divider for providing a reference pulse each time a predetermined number of said higher frequency pulses occurs.

8. The apparatus of claim 1, which further comprises a latch circuit for latching the value of the count in said counter in response to said reset signal from said control circuit.

9. The apparatus of claim 8, which further comprises a converter for converting the value latched in said latch circuit into analog form, and an analog meter for indicating thereon the converted value.

10. An apparatus for measuring the level of a liquid contained in a vessel, said liquid having a specific inductive capacity, comprising:
(a) a first electrode having an electrostatic capacity determined by the liquid level, said first electrode being connected to a first oscillator for generating first oscillator pulses at a repetition period directly proportional to the electrostatic capacity of said first electrode;
(b) a second electrode having an electrostatic capacity determined by the specific inductive capacity of said liquid, said first electrode being connected to a second oscillator for generating second oscillator pulses at a repetition period directly proportional to the electrostatic capacity of said second electrode;
(c) a counter for counting said second oscillator pulses from said second oscillator;
(d) a control circuit for generating a control signal to reset and at the same time start said counter counting second oscillator pulses each time a predetermined number of first oscillator pulses occurs;
(e) a first gate circuit for disconnecting said second oscillator from said counter for a predetermined time each time a predetermined number of first oscillator pulses occurs; and
(f) a second gate circuit for disconnecting said first oscillator from said control circuit for a predetermined time each time a predetermined number of second oscillator pulses occurs, thereby permitting said counter to accumulate a count equal to the liquid level for a time interval between successive control signals.

11. The apparatus of claim 10, wherein said first electrode comprises two electrode plates facing in spaced-parallel relation to each other and immersed in the liquid.

12. The apparatus of claim 10 or 11, wherein said second electrode comprises two electrode plates facing in spaced-parallel relation to each other and immersed in said liquid.

13. The apparatus of claim 10, wherein said first gate circuit comprises:
a divider for generating a pulse each time a predetermined number of first oscillator pulses occurs;
a monostable device triggered into an unstable state by a pulse from said divider, said monostable device returning to a stable state a predetermined time after the occurrence of the pulse from said divider; and
means for disconnecting said second oscillator from said counter when said monostable device is in its stable state.

14. The apparatus of claim 10, wherein said second gate circuit comprises:
a divider for generating a pulse each time a predetermined number of second oscillator pulses occurs;
a monostable device triggered into an unstable state by a pulse from said divider, said monostable device returning to a stable state a predetermined time after the occurrence of the pulse from said divider; and
means for disconnecting said first oscillator from said control circuit when said monostable device is in its stable state.

15. The apparatus of claim 10, which further comprises a latch circuit, responsive to a reset signal from said control circuit, for latching the value of the count in said counter.

16. The apparatus of claim 13, which further comprises a latch circuit, responsive to a reset signal from said control circuit, for latching the value of the count in said counter.

17. The apparatus of claim 14, which further comprises a latch circuit, responsive to a reset signal from said control circuit, for latching the value of the count in said counter.

* * * * *